(No Model.)

T. WOOLLENS, Jr.
ROTARY WATER METER.

No. 473,046.      Patented Apr. 19, 1892.

Witnesses
A. Ruppert
G. B. Towles

Inventor:
Theodore Woollens Jr
Per
Thomas P. Simpson
Atty

UNITED STATES PATENT OFFICE.

THEODORE WOOLLENS, JR., OF CHEYENNE, WYOMING.

ROTARY WATER-METER.

SPECIFICATION forming part of Letters Patent No. 473,046, dated April 19, 1892.

Application filed February 9, 1892. Serial No. 420,891. (No model.)

*To all whom it may concern:*

Be it known that I, THEODORE WOOLLENS, Jr., a citizen of the United States, residing at Cheyenne, in the county of Laramie and State of Wyoming, have invented certain new and useful Improvements in Water-Meters; and I do hereby declare the following to be a full, clear, and exact description of the invention, such as will enable others skilled in the art to which it appertains to make and use the same.

The special object of the invention is to make a water-meter which will measure the quantity of water flowing through a mining or irrigating ditch, and thus enable each consumer to pay for exactly what he gets.

Figure 1:
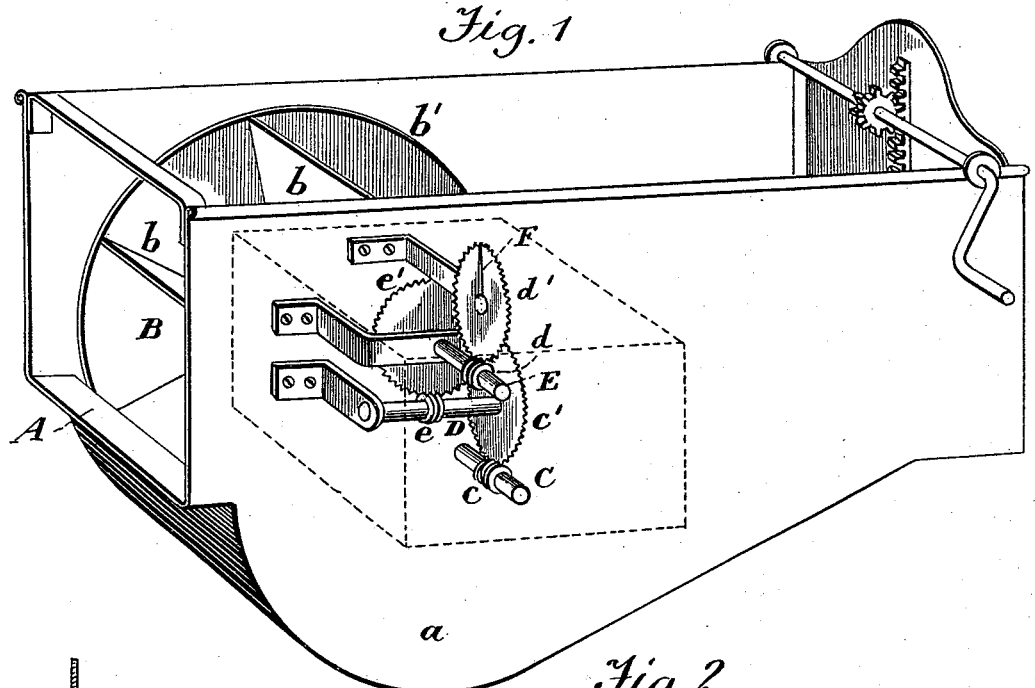
Figure 2:
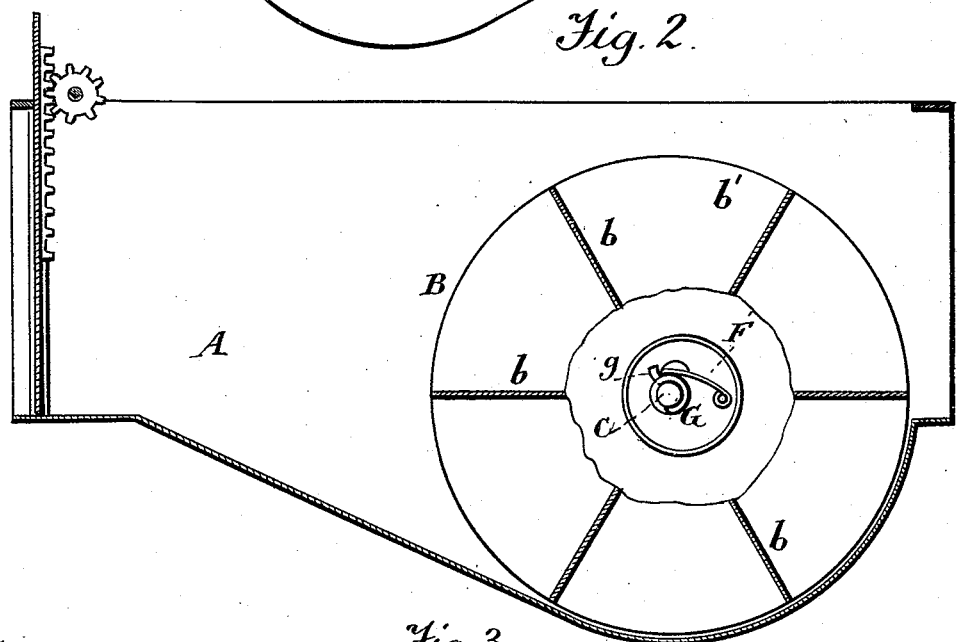
Figure 3:

Figure 1 of the drawings is a perspective view of my water-meter; Fig. 2, a longitudinal vertical section thereof; and Fig. 3, a detail view showing a coiled spring G, with an upwardly-projecting stud $g$ on its end to strike the end of a pivoted pawl F, both arranged in a lock-box on the end of the bucket-shaft.

In the drawings, A represents the flume through which the flowing water of a ditch is made to pass just before it reaches each consumer. This flume is provided with a quadrantal pit $a$, in which turn the buckets of a wheel B, journaled in the sides of the flume. This wheel has six buckets $b$ arranged between two disks $b'$ $b'$ and made of the same depth, or nearly so, as the said pit, so that the buckets may fit snugly therein without coming in contact with any part of the flume. By this construction one of the six buckets or sector divisions will always be in the pit and no bucket can discharge until it is full. The inlet and outlet of the pit are on a level, so that the pit will always be full of water, and a given wheel will have a velocity corresponding to the volume of water passing through it. Of course the flume may vary in size, according to the number of cubic feet or gallons of water which are expected to pass through it in a given time.

In order to give the quantity of water passing through each consumer's ditch in gallons or cubic feet and register it automatically, I use the wheel-shaft C and the counter-shafts D E and provide each with a worm and a dial-disk notched on the periphery, the worms $c$ $d$ $e$ meshing into and turning the disks $c'$ $d'$ $e'$. The dial $c'$ makes one revolution for every one hundred rotations of the wheel-shaft C and moves the dial $d'$ one notch. For every ten thousand revolutions of the wheel-shaft the dial $e'$ will be moved one notch, and for one million rotations of the shaft C the dial $e'$ will make one complete revolution, the number of cubic feet or gallons being indicated by a hand F. The flumes are so graded as to size that the wheel will not exceed twenty revolutions per minute and will make a faithful record for about thirty-five days and nights.

In order to prevent the wheel from being turned back, I use a ratchet pawl or detent F' and a coiled spring G, the latter permitting the wheel to retract a short distance when it meets with any obstruction under it. The detent and spring are inclosed in a lock-case, as also the registering mechanism, so that they cannot be touched by any one but some authorized person or inspector.

Having thus described all that is necessary to a full understanding of my invention, what I claim as new, and desire to protect by Letters Patent, is—

In a water-meter, the bucket-shaft C, provided with a box carrying a pivoted pawl F and a coiled spring G at one end, the spring having an upwardly-projecting end to come against the free end of the pawl, as and for the purpose set forth.

In testimony whereof I have affixed my signature in presence of two witnesses.

THEODORE WOOLLENS, JR.

Witnesses:
HARRY BLAKE,
C. CHENETOIR.